United States Patent
Kuo

(10) Patent No.: US 7,794,223 B2
(45) Date of Patent: Sep. 14, 2010

(54) TRI-PLATE INJECTION DIE WITH CHANGEABLE MALE AND FEMALE DIE CORES

(76) Inventor: Fei-Pin Kuo, No. 45, Lane 428, Jhongjheng N. Rd., Sanchong City, Taipei County (TW)

( * ) Notice: Subject to any disclaimer, the term of this patent is extended or adjusted under 35 U.S.C. 154(b) by 498 days.

(21) Appl. No.: 11/858,206

(22) Filed: Sep. 20, 2007

(65) Prior Publication Data

US 2009/0081324 A1     Mar. 26, 2009

(51) Int. Cl.
*B29C 45/26* (2006.01)
(52) U.S. Cl. .................. 425/190; 425/192 R
(58) Field of Classification Search .......... 425/190, 425/192 R, 195
See application file for complete search history.

(56) References Cited

U.S. PATENT DOCUMENTS 4,828,479 A * 5/1989 Pleasant ............ 425/192 R
5,366,364 A * 11/1994 Tanaka et al. ........... 425/192 R
7,462,027 B2 * 12/2008 Chien .................. 425/192 R

* cited by examiner

*Primary Examiner*—James Mackey
(74) *Attorney, Agent, or Firm*—Guice Patents PLLC

(57) ABSTRACT

A tri-plate injection die with changeable male and female die cores, it has a movable-side die plate having therein a receiving space for changeably assembling in the space a male die core and a supporting plate, a movable-side mounting plate having two spaced blocks being respectively abutted on a junction between a supporting plate and the movable-side die plate to form contact areas to bear the injection pressure. And a fixed-side die plate with a receiving space for changeably assembling in the space a female die core and a changeable casting channel die core. The casting channel die core has therein a substituting casting channel that can change position deviation; thereby an injection point of hot molten plastics injected into the die can be changed in pursuance of the shape of the cavity of the female die core.

12 Claims, 6 Drawing Sheets

TRI-PLATE INJECTION DIE WITH CHANGEABLE MALE AND FEMALE DIE CORES

BACKGROUND OF THE INVENTION

1. Field of the Invention

The present invention relates to a tri-plate injection die, and especially to an injection die with a changeable male and a changeable female die core.

2. Description of the Prior Art

A conventional injection die generally used is composed mainly of a movable-side die seat and a fixed-side die seat, the fixed-side die seat is fixed on an injection shaping machine, while the movable-side die seat is displaceably installed, hence the movable-side die seat can get close to or get away from the fixed-side die seat along its moving direction to complete the producing processes of die connecting, material injecting and die releasing etc.

In the injection die, a male die core is mounted in a movable-side die plate, and is abutted against a lateral outer surface of the movable-side die plate by a movable-side mounting plate; while a female die core is mounted in a fixed-side die plate, and is used to mount a casting-channel die releasing plate on the outer surface of the fixed-side die plate by means of a fixed-side mounting plate. By virtue that the fixed-side die seat is composed mainly of the fixed-side mounting plate, the casting-channel die releasing plate and the fixed-side die plate, normally, it is called as a tri-plate injection die.

Of such a tri-plate injection die, the movable-side die plate in the movable-side die seat is directly shaped by cutting with metallic wires and NC shaping, and the center of which is excavated to form the male die core; and the fixed-side die plate in the fixed-side die seat as well as the female die core are similarly processed for shaping. A casting channel is provided between the fixed-side die plate and the female die core, and has an altitude equal to that of a casting channel of the male die core.

With such a designing, a user can arrange oppositely a male die block formed in the vicinity of the movable-side die seat to a female die block formed in the vicinity of the fixed-side die seat, in order that the male die core and the female die core are opposite to each other; and molten plastics can be cast into the space formed from the cavities of the male die core and the female die core to cool down and complete an injected article. The casting channel is directly provided on the fixed-side mounting plate by NC drilling, the casting channel is a continuous injection material flowing channel and does not have a function of being able of changing position deviation, thereby the injection point of hot molten plastics injected into the die is fixed against adjusting.

By virtue that the casting channel is directly provided on the fixed-side mounting plate by NC drilling, the casting channel thus does not have the function of being able of changing position deviation, thereby the injection point of hot molten plastics injected into the die is fixed against adjusting; and thereby when it is desired to produce some other injection molded article, one must ask a manufacturer to open dies for another brand new pair die cores including a male die core and a female die core which are arranged opposite to each other; this renders the user to pay high equipment purchasing cost when fashions of products to be produced are too many, besides, inner and outer pushing out plates and die seats etc. already purchased in advance will occupy much space in a factor, thus improvement is required.

SUMMARY OF THE INVENTION

In view of the above defect resided in the above stated injection die, the inventor of the present invention provides a tri-plate injection die with a changeable male and a changeable female die core after hard study and nonstop improving to an aim of making a die structure more perfect.

Therefore, the object of the present invention is: to provide a tri-plate injection die with a changeable male and a changeable female die core that can render a user to simply purchase a male die core, a supporting plate, a female die core and a changeable casting channel die core, to thereby directly change them for old ones and lock them onto a movable-side die seat and a fixed-side die seat, so that the user needs not to give an order for producing brand new inner and outer pushing out plates, die seats and dies etc. to thereby save storing space. Meantime, a changeable casting channel die core that can be singly embedded in the fixed-side die seat can be made in casting, the changeable casting channel die core is a continuous injection material flowing channel and does not have a function of being able of changing position deviation, thereby the object of adjusting the injection point of hot molten plastics injected into the die by selecting different changeable casting channel die cores can be obtained.

In order to achieve the above object, a tri-plate injection die with a changeable male and a changeable female die core was invented, the measure for it is: a fixed-side die plate has at its center a receiving space, the space is provided at its two mutually opposite sides with a changeable casting channel die core and a female die core; a movable-side die plate has in its center a receiving space, the space is provided at its two mutually opposite sides with a male die core and a supporting plate, the supporting plate is connected at the outer side thereof with an inner and an outer pushing out plate mutually neighboring with each other; a movable-side mounting plate is provided at one side of which with two mutually parallelly spaced blocks having in their middle an upper and a lower supporting stub, the inner and the outer pushing out plates are placed between the upper and the lower supporting stubs, in order that two mutually opposite edges (a left and a right edge) of the supporting plate are abutted on the spaced blocks respectively; and a changeable casting channel die is arranged between a fixed-side mounting plate and the fixed-side die plate.

Thereby when in practicing, the user uses a screw (or a pin) to mount the male die core and the supporting plate on or change the same for mounting on the movable-side die plate, and to mount the female die core and the changeable casting channel die core on or change the same for mounting on the fixed-side die plate, in cooperation with the two mutually opposite edges (the left and the right edge) of the supporting plate being abutted on the two spaced blocks at one side of the movable-side mounting plate for the purpose that the pressure of injection can be born, and the changeable casting channel die core being provided therein with a continuous casting channel allowing changing position deviation, the casting channel can change the injection point of hot molten plastics injected into the die.

Further, the fixed-side mounting plate of the present invention is mounted on its outer side with a material pulling-pin pressing plate for fixing pulling pins. And using of the pulling pins can be flexible when another changeable casting channel die core with a different casting channel is used in stead.

The present invention will be apparent after reading the detailed description of the preferred embodiment thereof in reference to the accompanying drawings.

DETAILED DESCRIPTION OF THE PREFERRED EMBODIMENT

Figure 1:
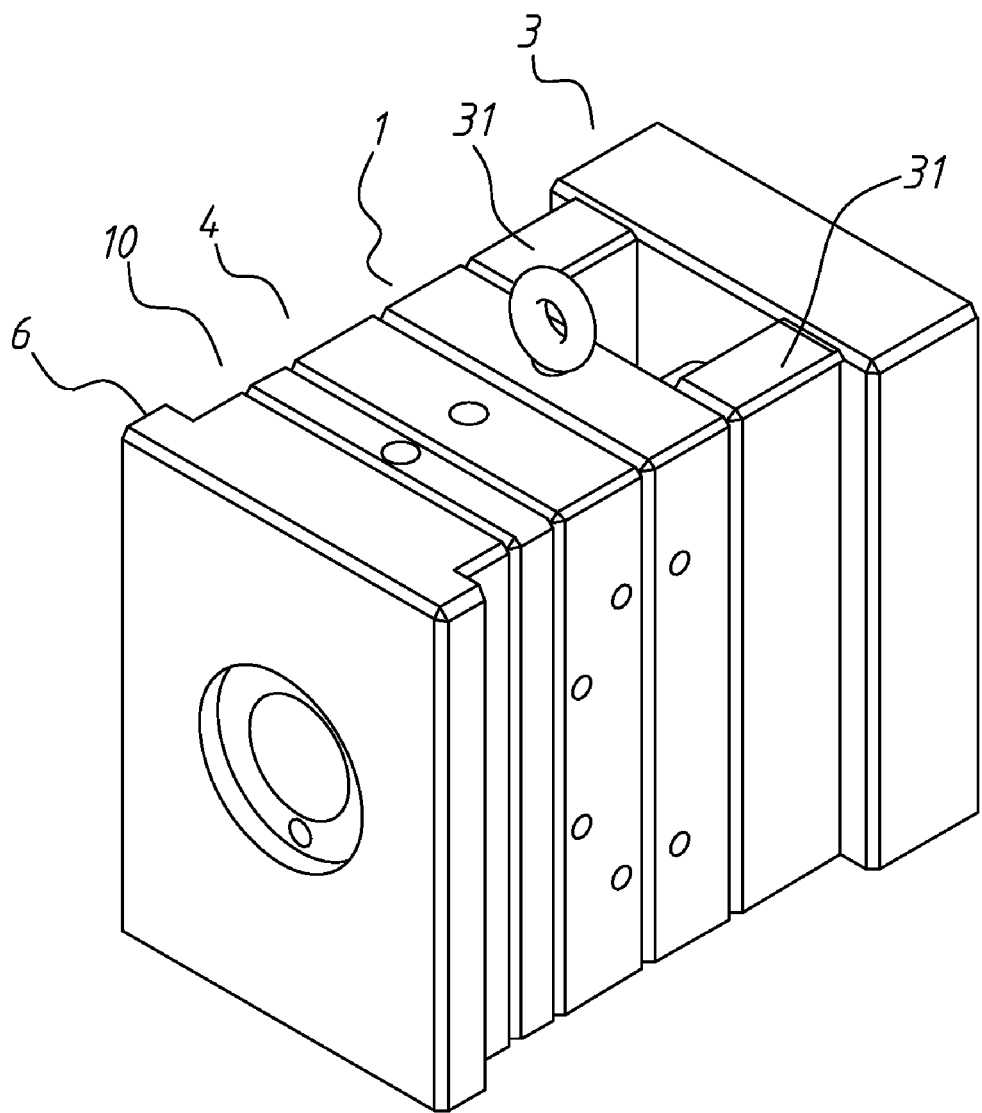
FIG. 1 is a perspective view of the present invention after assembling.
Figure 2:
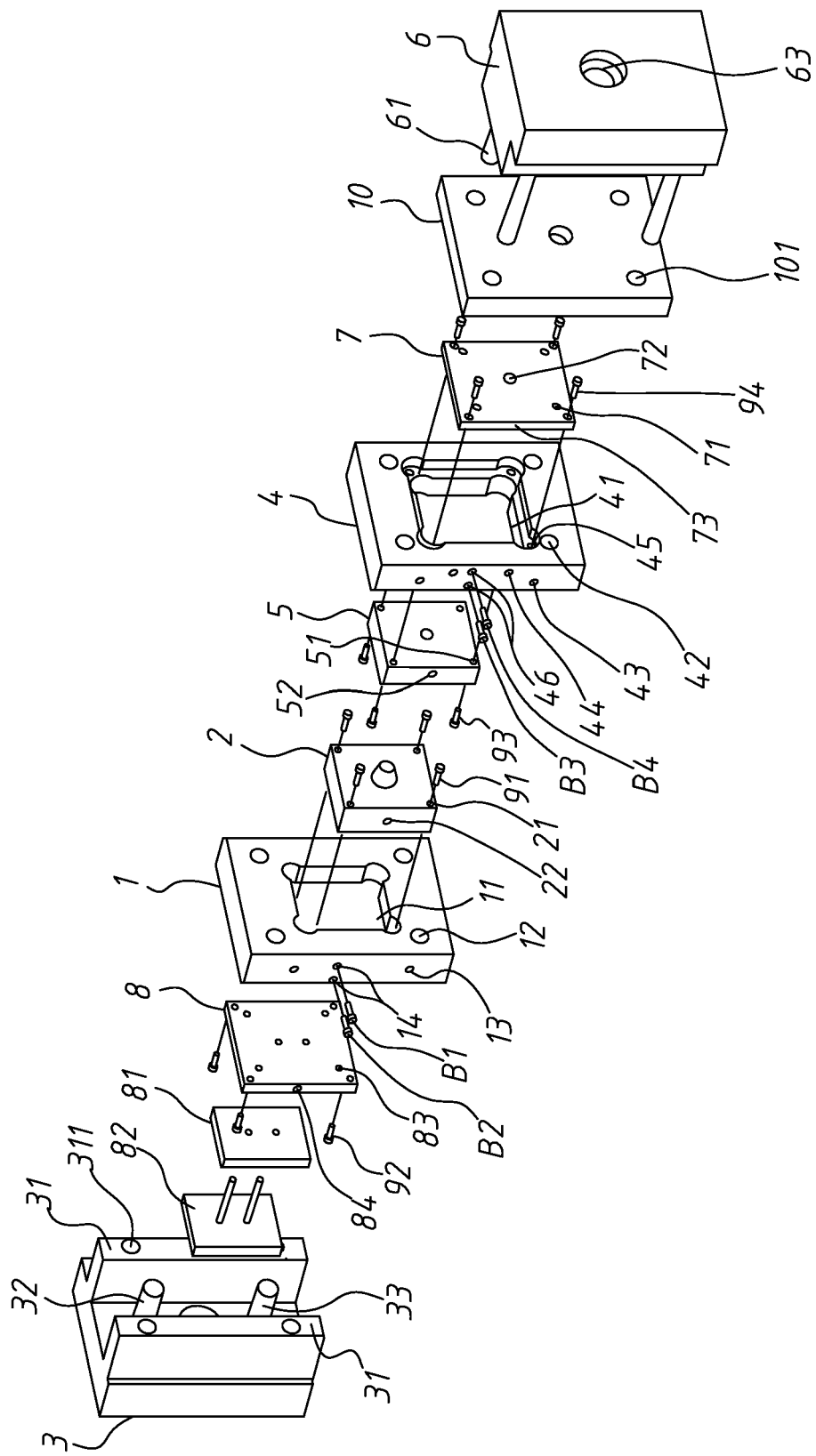
FIG. 2 is an anatomic perspective view of the embodiment as in FIG. 1 of the present invention.
Figure 4:
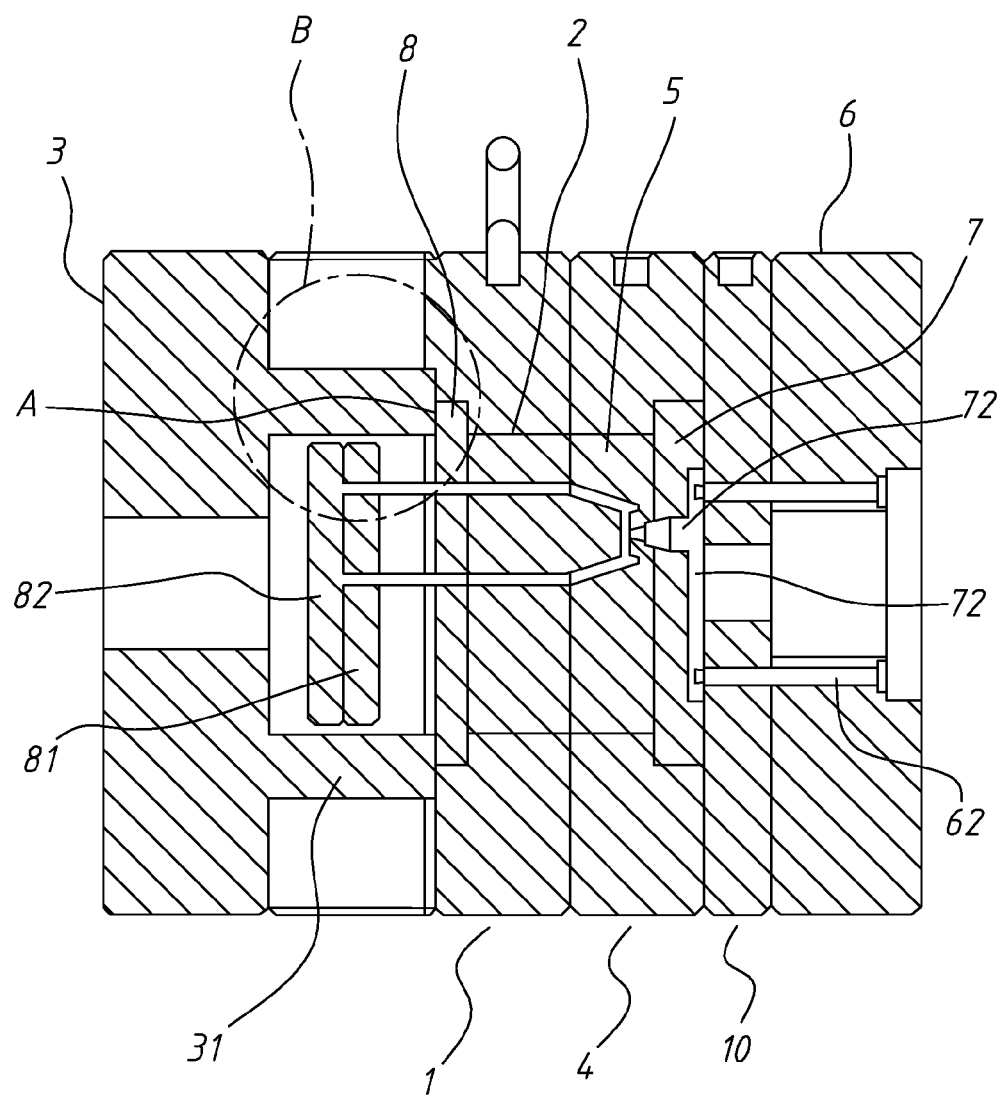
FIG. 4 is a sectional view taken longitudinally from FIG. 1.

Referring to FIGS. 1, 2 and 4 which are perspective views of the present invention after assembling, in which the main portion is composed of a fixed-side mounting plate 6, a fixed-side die plate 4, a movable-side die plate 1 and a movable-side mounting plate 3. And a casting-channel die releasing plate 10 is arranged between the fixed-side mounting plate 6 and the fixed-side die plate 4.

The movable-side mounting plate 3 is provided on its inner side with two mutually parallelly spaced blocks 31 respectively abutted on an outer side of the movable-side die plate 1.

In the process of wire cutting and NC shaping, the movable-side die plate 1 is directly excavated to form a receiving space 11, the receiving space 11 is provided on its two sides respectively with a male die core 2 and a supporting plate 8. The supporting plate 8 has at the outer side thereof an inner pushing out plate 81 and an outer pushing out plate 82 mutually neighboring with each other; additionally, the movable-side die plate 1 is provided on the edge of its inner side with a plurality of through holes 12 for piercing therethrough of a plurality of supporting rails 61, and is provided on a lateral side of it with a plurality of water holes 13, and a plurality of insertion holes 14 are provided for inserting of a plurality of insertion pins B1, B2 in them to increase the effect of fixing.

The male die core 2 is assembled with the supporting plate 8 by using a plurality of screws 91 to be completely retracted into the receiving space 11 of the movable-side die plate 1. The screws 91 lock screw holes 21 of the male die core 2 to screw holes 83 on the edge of the inner side of a female die core 5, and the male die core 2 is provided on a lateral side of it with an inserting hole 22 for inserting of an insertion pin B1, to increase the effect of fixing. The supporting plate 8 is assembled with and completely retracted into to be flush with the outer surface of the receiving space 11 of the movable-side die plate 1 by using a plurality of screws 92, and is provided on a lateral side of it with an inserting hole 84 for inserting of an insertion pin B2.

Figure 3:
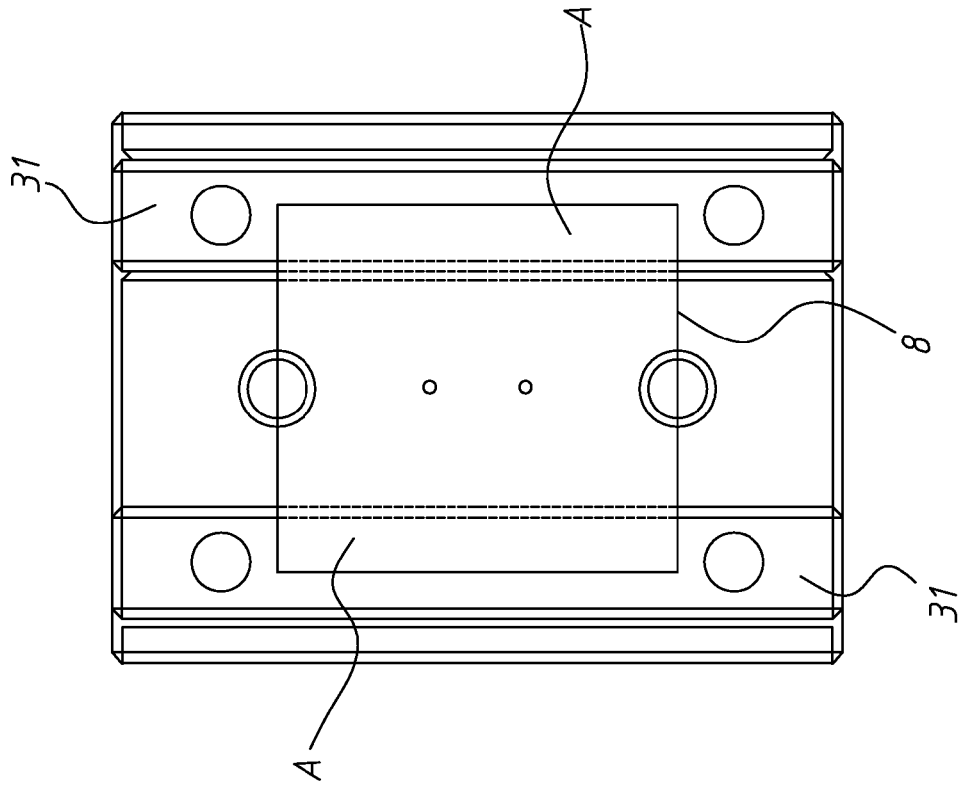
FIG. 3 is a schematic and partially enlarged view of the present invention showing that two mutually opposite edges (a left and a right edge) of a supporting plate are abutted on spaced blocks respectively.
Figure 5:
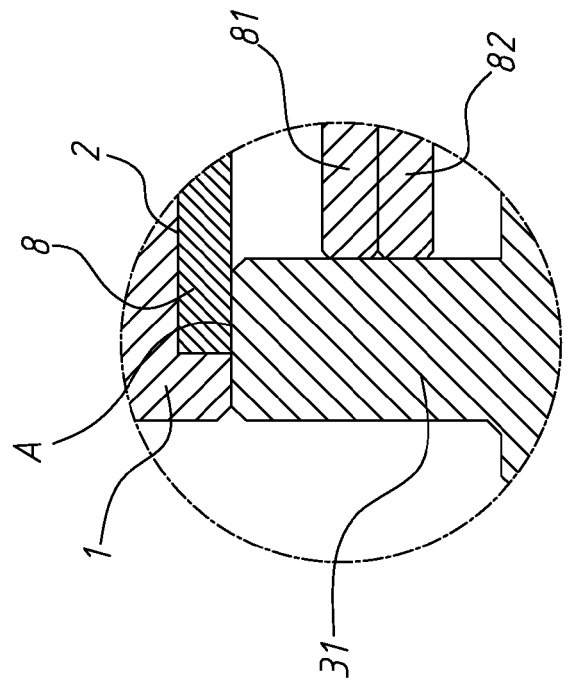
FIG. 5 is an enlarged sectional view of a "B" part in FIG. 4.

Further, the two mutually parallelly spaced blocks 31 of the movable-side mounting plate 3 are provided in their middle with an upper and a lower supporting stub 32, 33, the inner and the outer pushing out plates 81, 82 are placed between the upper and the lower supporting stubs 32, 33, in order that two mutually opposite edges (a left and a right edge) of the supporting plate 8 are abutted on a part of one of the spaced blocks 31 respectively (please refer to FIG. 3). The spaced blocks 31 are provided with a plurality of through holes 311 for piercing therethrough of the supporting rails 61.

The fixed-side die plate 4 also is provided with a plurality of through holes 42 on an edge of an inner side of it for piercing therethrough of the supporting rails 61, and is provided on a lateral side of it with a plurality of water holes 43 and a temperature-sensitive insertion hole 44, and/or a plurality of insertion holes 46 for inserting of a plurality of insertion pins B3, B4 in them to increase the effect of fixing. The fixed-side die plate 4 has at its center a receiving space 41, the space 41 is provided at its two mutually opposite sides with a changeable casting channel die core 7 and the female die core 5.

The fixed-side mounting plate 6 has thereon the supporting rails 61 that are extended through the casting-channel die releasing plate 10, the fixed-side die plate 4, the movable-side die plate 1 and the movable-side mounting plate 3; it is provided with a plurality of material injection holes for inserting of material pulling-pins 62 therethrough (referring to FIG. 4). The fixed-side mounting plate 6 has a central round hole 63 for extending of a material injection head therethrough.

The female die core 5 is assembled with the changeable casting channel die core 7 by means of a plurality of screw 93 and is completely retracted into the receiving space 41. The screw 93 are used, for instance, to lock corner screw holes 51 on the edge of the inner side of the female die core 5 together with a plurality of in screw holes 71 on the changeable casting channel die core 7, and an insertion hole 52 is provided for inserting of another insertion pin B3 in it to increase the effect of fixing.

The changeable casting channel die core 7 is assembled with and completely retracted into to be flush with the receiving space 41 by using a plurality of screws 94 extending into screw holes 45, or it is provided on a lateral side of it with an inserting hole 73 for inserting of an insertion pin B4, to more increasing the effect of fixing. Further, the changeable casting channel die core 7 in the fixed-side die plate 4 and the fixed-side mounting plate 6 are arranged therebetween with the casting-channel die releasing plate 10.

The casting-channel die releasing plate 10 is provided on the edge of the inner side of it with a plurality of through holes 101 for piercing therethrough of the supporting rails 61. And the casting-channel die releasing plate 10 has the inner side of it extended through by the material pulling-pins 62 of the fixed-side mounting plate 6, so that articles made can extract residual material out of an injection port during die releasing. The casting-channel die releasing plate 10 is provided at its center with a central round hole for extending of a material injection head therethrough.

By the fact that the male die core 2 is subjected to a quite large pressure, thereby as shown in FIG. 3, two mutually opposite edges (a left and a right edge) of the supporting plate 8 are abutted on the two spaced blocks 31 respectively, the width between the two spaced blocks 31 is smaller than that of the supporting plate 8, so that the two mutually opposite edges of the supporting plate 8 and the two spaced blocks 31 form contact areas (A) in order to bear the injection pressure.

As shown in FIG. 4 which is a sectional view taken longitudinally from FIG. 1, the injection pressure born by the contact areas (A) requires that the hardness of material of the movable-side die plate 1 and the fixed-side die plate 4 shall preferably be within the range of 20 kg/cm$^2$~200 kg/cm$^2$ to afford such bearing.

The changeable casting channel die core 7 is provided therein with a new substituting casting channel 72 in order to change the injection point of hot molten plastics injected into the die, the casting channel 72 cooperates with the material pulling-pins 62 extended out of the casting-channel die releasing plate 10 to make convenient releasing of the residual material in the casting channel 72 from the die after the article is shaped.

Furthermore, by virtue of the changeability of the male die core 2 and the female die core 5, the casting channel 72 can be given with different casting channels 72 in pursuance of different articles to be made; and sometimes the material pulling-pins 62 of the fixed-side mounting plate 6 shall be displaced. For these situations, the fixed-side mounting plate 6 of the present invention is cooperatively designed to make material pulling-pins 62 adjustable.

Figure 6:
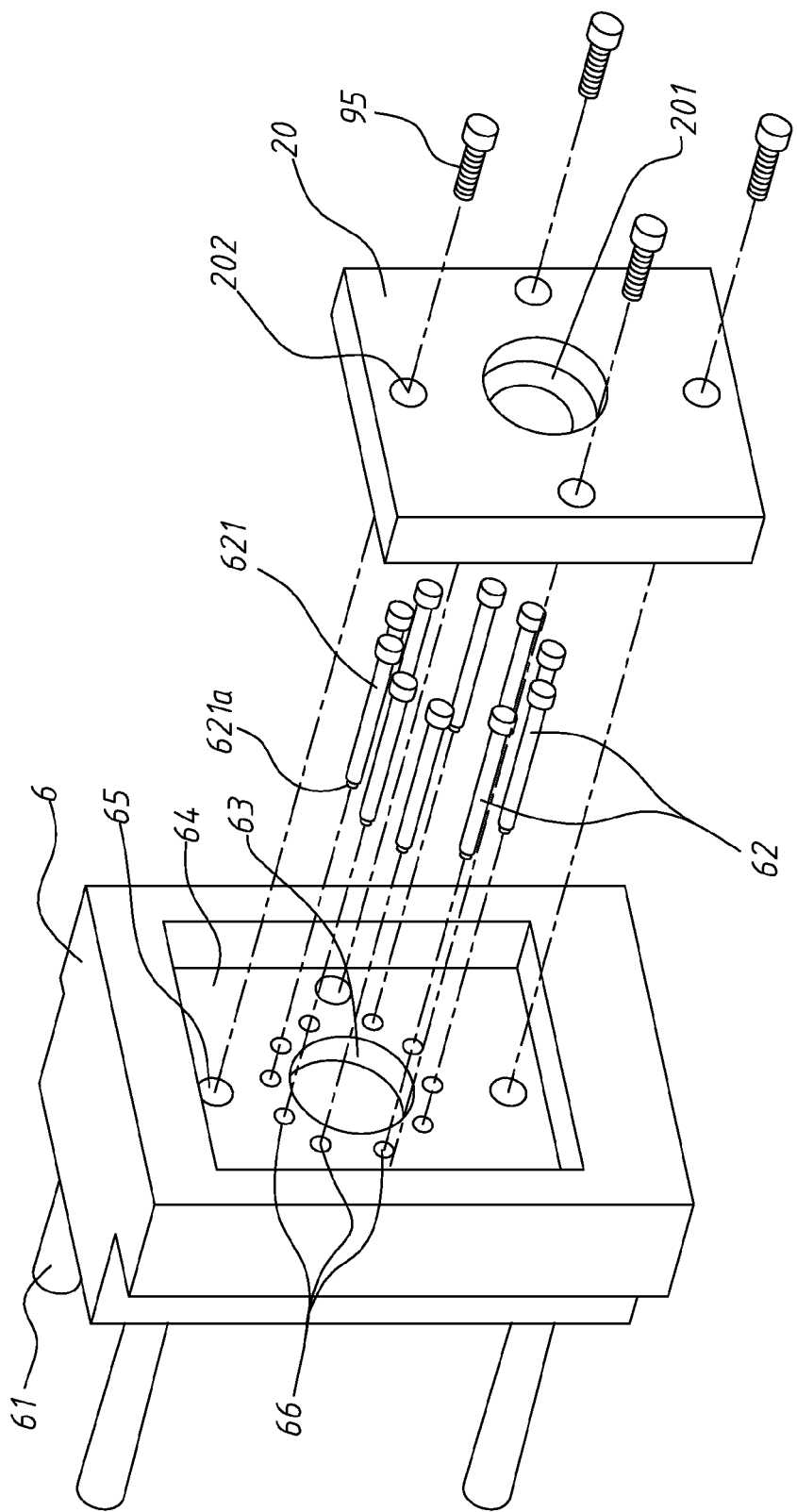
FIG. 6 is an anatomic perspective view of another embodiment of a fixed-side mounting plate of the present invention.
Figure 7:
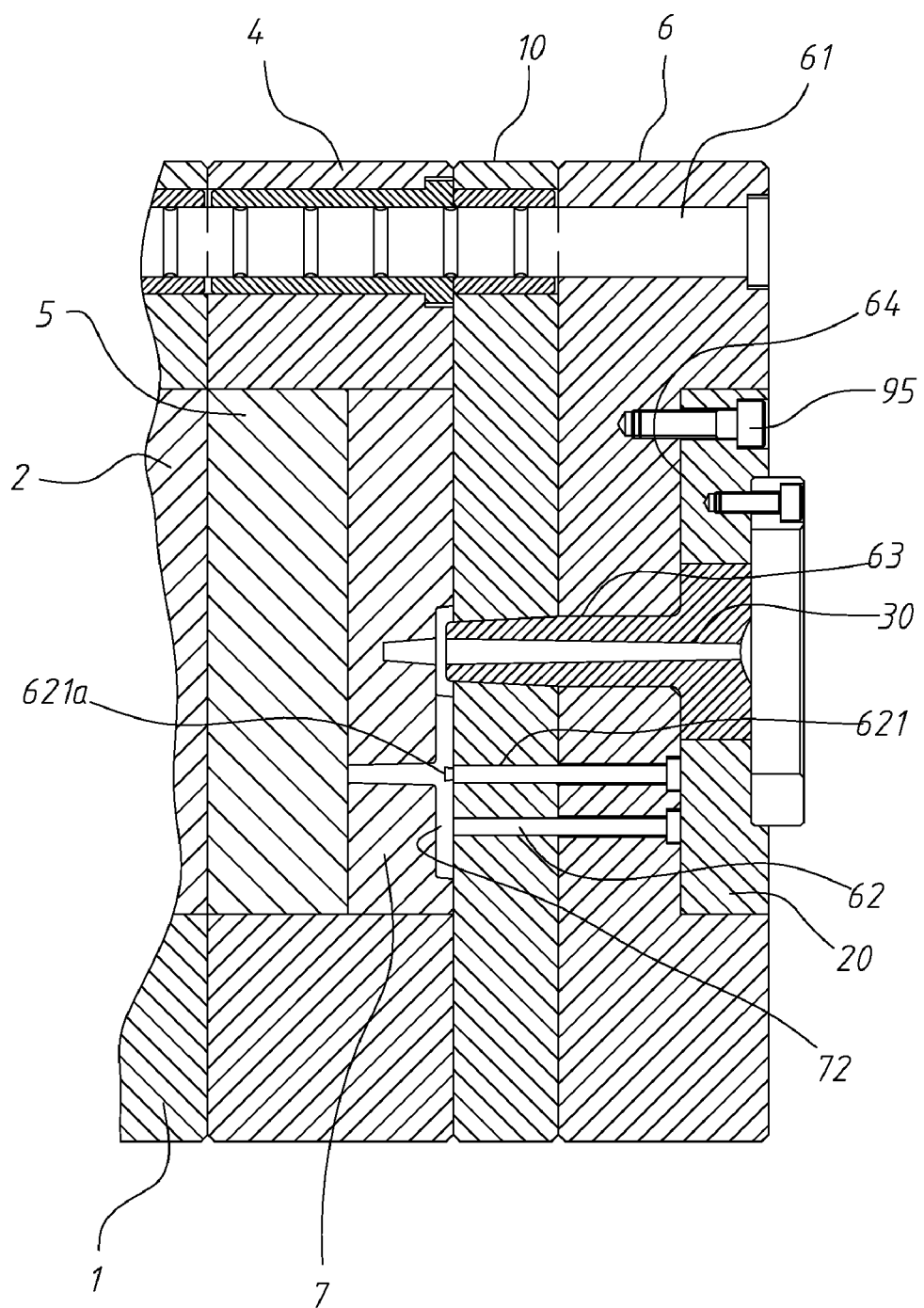
FIG. 7 is a sectional view of the other embodiment as in FIG. 6 of the present invention.

Referring to FIG. 6, the fixed-side mounting plate 6 is formed on its outer surface a recess 64 which is placed therein with a material pulling-pin pressing plate 20 having a mounting hole 201 for mounting a material injection head. The material pulling-pin pressing plate 20 is extended with screws 95 through screw holes 202 to lock in and is fixed in screw holes 65 on the bottom surface of the recess 64. The central round hole 63 on the fixed-side mounting plate 6 is provided therearound with a plurality of material pulling-pin holes 66 provided for the casting channel 72 of the changeable casting channel die core 7, each material pulling-pin hole 66 can be extended therethrough by one of the material pulling-pins or a main material pulling-pin 621. The main material pulling-pin 621 is formed on its front end a wedge shaped tip 621a which is embedded in the injection point of the casting channel 72 (directing to the position that the casting channel 72 is extended to in the female die core 5); the remaining material pulling-pins 62 seal the material pulling-pin holes 66 that communicates the casting channel 72.

The material injection head 30 is mounted in the mounting hole 21 of the material pulling-pin pressing plate 20, and is connected with the casting channel 72 of the changeable casting channel die core 7, injected material can thus be injected into the male die core 2 and the female die core 5. When in releasing the injection die, by the fact that the wedged tip 621a of the main material pulling-pins 621 is embedded in the casting channel 72, the residual material in the casting channel 72 can be extracted out of the casting channel 72 in favor of the next time material injection.

With such a structure, the male die core 2 and the female die core 5 can be more easily changed.

In conclusion, according to the description disclosed above, in comparison with a conventional injection die, the present invention needs only to purchase different kinds of male die cores, female die cores and changeable casting channel die cores for assembling with one another, this can have the advantages of saving space for storing redundant dies and disbursement for designing, manufacturing and reopening moulds, and can do continuous material injecting as well as can change position deviation to adjust the injection point of hot molten plastics injected into the die. Thus the present invention is an excellent invention with increased effect, and it has not been published nor publicly used.

Having thus described the technical structure of the present invention with practicability and improvement, what I claim as new and desire to be secured by Letters Patent of the United States is:

1. A tri-plate injection die with a changeable male and a changeable female die core comprising:
    a movable-side die plate, having on one side of it a male die core and on other side of it a movable-side mounting plate fixedly connected therewith;
    a fixed-side die plate, having on one side of it a female die core;
    a fixed-side mounting plate, provided on one side of it with a plurality of supporting rails to extend through said fixed-side die plate, said movable-side die plate and said movable-side mounting plate; and
    a casting-channel die releasing plate arranged between said fixed-side mounting plate and said fixed-side die plate; said tri-plate injection die is characterized by: said fixed-side die plate has at its center a receiving space, said receiving space of said fixed-side die plate is provided at its two mutually opposite sides with a changeable casting channel die core and said female die core; said movable-side die plate has in its center a receiving space, said receiving space of said movable-side die plate is provided at its two mutually opposite sides with said male die core and a supporting plate, said supporting plate is connected at the outer side thereof with an inner and an outer pushing out plate mutually neighboring with each other; said movable-side mounting plate is provided at one side of which with two mutually parallelly spaced blocks having in their middle an upper and a lower supporting stub, said inner and said outer pushing out plates are placed between said upper and said lower supporting stubs, in order that two mutually opposite edges of said supporting plate are abutted on said spaced blocks respectively.

2. The tri-plate injection die with a changeable male and a changeable female die core as claimed in claim 1, wherein said supporting plate is assembled with and completely retracted into said receiving space of said movable-side die plate by using a plurality of screws, and is provided on a lateral side of it with an inserting hole for inserting of an insertion pin.

3. The tri-plate injection die with a changeable male and a changeable female die core as claimed in claim 1, wherein said male die core is assembled with said receiving space of said movable-side die plate by using a plurality of screws; and said male die core is provided on a lateral side of it with an inserting hole for inserting of an insertion pin.

4. The tri-plate injection die with a changeable male and a changeable female die core as claimed in claim 1, wherein said changeable casting channel die core is provided therein with a casting channel, said changeable casting channel die core is assembled with and completely retracted into said receiving space of said fixed-side die plate by using a plurality of screws, and is provided on a lateral side of it with an inserting hole for inserting of an insertion pin.

5. The tri-plate injection die with a changeable male and a changeable female die core as claimed in claim 1, wherein said female die core is completely retracted into said receiving space of said fixed-side die plate by using a plurality of screws, and is provided on a lateral side of it with an inserting hole for inserting of an insertion pin.

6. The tri-plate injection die with a changeable male and a changeable female die core as claimed in claim 1, wherein width between said two spaced blocks is smaller than that of said supporting plate, so that two mutually opposite edges of said supporting plate and said two spaced blocks form contact areas when being contacted with each other in order to bear an injection pressure, and said spaced blocks are provided with a plurality of through holes for piercing therethrough of said supporting rails.

7. The tri-plate injection die with a changeable male and a changeable female die core as claimed in claim 6, wherein said injection pressure born by said contact areas requires that hardness of material of said movable-side die plate and said fixed-side die plate is within a range of 20 kg/cm 2~200 kg/cm2.

8. The tri-plate injection die with a changeable male and a changeable female die core as claimed in claim 1, wherein said casting-channel die releasing plate is provided on an edge of an inner side of it with a plurality of through holes for piercing therethrough of said supporting rails.

9. The tri-plate injection die with a changeable male and a changeable female die core as claimed in claim 1, wherein said fixed-side die plate is provided on an edge of an inner side of it with a plurality of through holes for piercing therethrough of said supporting rails, and is provided on a lateral side of it with a plurality of water holes and a temperature-sensitive insertion hole and a plurality of insertion holes for inserting of a plurality of insertion pins.

10. The tri-plate injection die with a changeable male and a changeable female die core as claimed in claim 1, wherein said movable-side die plate is provided on an edge of its inner side with a plurality of through holes for piercing therethrough of said supporting rails, and is provided on a lateral side of it with a plurality of water holes, and a plurality of insertion holes for inserting of a plurality of insertion pins.

11. The tri-plate injection die with a changeable male and a changeable female die core as claimed in claim 1, wherein said fixed-side mounting plate is formed on its outer surface a recess which has therein a material pulling-pin pressing plate having a mounting hole for mounting a material injection head; a central round hole on said fixed-side mounting plate is provided therearound with a plurality of material pulling-pin holes provided for a casting channel on said changeable casting channel die core, said material pulling-pin hole each is extended therethrough by one of a predetermined number of material pulling-pins or a main material pulling-pin; said main material pulling-pin is formed on its front end a wedge shaped tip which is embedded in an injection point of said casting channel; remainders of said material pulling-pins seal those of said material pulling-pin holes that communicates the casting channel.

12. The tri-plate injection die with a changeable male and a changeable female die core as claimed in claim 11, wherein said material pulling-pin pressing plate is extended with screws through screw holes thereon to lock in and is fixed in screw holes on a bottom surface of said recess.

\* \* \* \* \*